United States Patent  (10) Patent No.: US 7,450,172 B2
Lee et al.  (45) Date of Patent: Nov. 11, 2008

(54) BAR-TYPE WIRELESS COMMUNICATION TERMINAL AND ROTARY TYPE HINGE DEVICE THEREOF

(75) Inventors: Jae-Gab Lee, Kumi-shi (KR); Young-Kyu Kim, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 983 days.

(21) Appl. No.: 10/628,224

(22) Filed: Jul. 29, 2003

(65) Prior Publication Data

US 2004/0179330 A1  Sep. 16, 2004

(30) Foreign Application Priority Data

Mar. 11, 2003  (KR) .................... 10-2003-0015105

(51) Int. Cl.
  H04N 5/225 (2006.01)
  H04N 5/222 (2006.01)
  H04M 1/00 (2006.01)
(52) U.S. Cl. ............... 348/373; 348/333.06; 455/556.1
(58) Field of Classification Search ......... 348/373–376, 348/333.06
  See application file for complete search history.

(56) References Cited

U.S. PATENT DOCUMENTS 6,295,088 B1 * 9/2001 Tsukahara et al. ..... 348/333.06
6,347,997 B1 * 2/2002 Armstrong ................ 463/37
6,549,789 B1 * 4/2003 Kfoury ..................... 455/550.1
6,751,473 B1 * 6/2004 Goyal et al. ............. 455/556.1
6,965,413 B2 * 11/2005 Wada ......................... 348/376
6,980,735 B2 * 12/2005 Horiguchi ................ 455/556.1
6,999,802 B2 * 2/2006 Kim ............................ 348/373
7,038,726 B2 * 5/2006 Aoki .......................... 348/373
7,084,919 B2 * 8/2006 Shibata et al. ......... 348/333.06

* cited by examiner

*Primary Examiner*—Nhan T Tran
(74) *Attorney, Agent, or Firm*—Roylance, Abrams, Berdo & Goodman L.L.P.

(57) ABSTRACT

Disclosed herein is a bar-type wireless communication terminal, and a rotary type hinge device thereof. The bar-type wireless communication terminal comprises a lower body and an upper body. The lower body is installed at its one side surface with a camera lens unit, and at its front and rear surfaces with first and second keypads, respectively. The upper body is coupled to the upper end of the lower body so that it is rotatable in a twisting direction relative to a rotation axis extending in a longitudinal direction of the lower body. The upper body is installed at its front surface with a display device. According to the bar-type wireless communication terminal constructed as stated above and a rotary type hinge device thereof, it is possible to provide the user with a wider choice of the terminals. In addition, in conjunction with a display device and a camera lens unit additionally installed to the wireless communication terminal, the image display direction of the display device as well as an aim direction of the camera lens unit can be set at various different angles, thereby allowing the user to conveniently utilize the wireless communication terminal for image capturing and video communications.

21 Claims, 10 Drawing Sheets

BAR-TYPE WIRELESS COMMUNICATION TERMINAL AND ROTARY TYPE HINGE DEVICE THEREOF

PRIORITY

This application claims priority to an application entitled "BAR-TYPE WIRELESS COMMUNICATION TERMINAL AND ROTARY TYPE HINGE DEVICE THEREOF", filed in the Korean Industrial Property Office on Mar. 11, 2003 and assigned Serial No. 2003-15105, the contents of which are hereby incorporated by reference.

BACKGROUND OF THE INVENTION

1. Field of the Invention

The present invention relates to a wireless communication terminal, and more particularly to a wireless communication terminal and rotary type hinge device thereof.

2. Description of the Related Art

Generally, wireless communication terminals can be categorized according to their shape. For example, there are bar type terminals, flip type terminals and folder type terminals.

The bar type terminals comprise a single body housing which is provided with a keypad for data input, a display device for data output, and receiver and transmitter modules. Such a bar type terminal has an advantage that its entire construction is simple.

The flip type terminals generally comprise a terminal body, a flip cover, and a hinge device for rotatably coupling the flip cover to the terminal body. Although the terminal body of the flip type terminal is configured in the same manner as that of the bar type terminal, the flip cover covers a keypad provided on the terminal body in a call waiting mode. Thus, the flip type terminal has an advantage that it can prevent the keypad from malfunctioning.

The folder type terminals generally comprise a terminal body, a folder, and a hinge device for rotatably coupling the folder to the terminal body. The folder is opened away from or closed to the terminal body according to its rotation. In a call waiting mode wherein the folder is folded to come into close contact with the terminal body, the folder covers a keypad provided on the terminal body, thereby preventing malfunctioning of the keypad. Further, in a talk mode wherein the folder is unfolded to a certain opened position, design of the terminal ensures sufficient distance between its transmitter and receiver modules, thereby advantageously achieving miniaturization thereof. Those skilled in the art can appreciate the manner of classification of the terminals as stated above.

Meanwhile, as mobile communication services become increasingly diversified, their utilization range expands to various uses including motion picture providing services, video communications, financial services, as well as conventional short message services and voice communications. These utilizations are provided through various add-ons which include camera lens units, installed in the wireless communication terminals. In addition, as the use of wireless communication terminals becomes more popular throughout the world, customers require a wider selection of wireless communication terminals, in accordance with a variety of standards, designs and functions. As such, conventional terminals cannot sufficiently satisfy such diverse customers' requirements. Moreover, although slide type terminals and rotary folder type terminals, which enable reversal of the front and rear surfaces of its folder have become commercialized, they still cannot satisfy diverse customers' tastes.

SUMMARY OF THE INVENTION

Therefore, the present invention has been made in view of the above problem, and it is an object of the present invention to provide a new type wireless communication terminal, which is capable of expanding a selection range thereof in accordance with customers' increasingly diversified tastes.

It is another object of the present invention to provide a bar-type wireless communication terminal, which comprises an upper body and lower body, the upper body being configured to enable reversal of its front and rear surfaces relative to the lower body.

It is yet another object of the present invention to provide a rotary type hinge device, which rotatably couples an upper body of a wireless communication terminal to the upper end of a lower body thereof so that front and rear surfaces of the upper body are reversed.

In accordance with one embodiment of the present invention, the above and other objects can be accomplished by the provision of a bar-type wireless communication terminal comprising a lower body installed at its one side surface with a camera lens unit, and at its front and rear surfaces with first and second keypads, respectively, and an upper body coupled to an upper end of the lower body, so that it is rotatable in a twisting direction relative to a rotation axis extending in a longitudinal direction of the lower body, the upper body being installed at its front surface with a display device.

In accordance with another embodiment of the present invention, there is provided a rotary type hinge device for a wireless communication terminal comprising a first hinge base having a hinge housing and first coupling arms extended laterally in opposite directions from a lower end of the hinge housing, the hinge housing defining a vertically extended receiving space. The rotary type hinge device further comprises, a second hinge base having a rotating member and second coupling arms extended laterally in opposite directions from an upper end of the rotating member, the rotating member being received inside the hinge housing to rotate therein relative to a rotation axis extending in a vertical direction of the first hinge base.

In accordance with another embodiment of the present invention, there is provided a rotary type hinge device for a bar-type wireless communication terminal comprising a lower body, and an upper body coupled to an upper end of the lower body so that it is rotatable in a twisting direction relative to a rotation axis extending in a longitudinal direction of the lower body. The rotary type hinge device comprises, a first hinge base having a hinge housing and first coupling arms extended laterally in opposite directions from a lower end of the hinge housing, the hinge housing defining a vertically extended receiving space, the first hinge base being fixed inside the lower body so that the hinge housing is protruded upwardly out of the upper end of the lower body at its upper end. The rotary type hinge device further comprises a second hinge base having a rotating member and second coupling arms extended laterally in opposite directions from an upper end of the rotating member, the rotating member being coupled to the hinge housing to rotate therein relative to a rotation axis extending in a vertical direction of the first hinge base, the second hinge base being fixed inside the upper body so that the rotating member is protruded downwardly out of a lower end of the upper body at its lower end.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
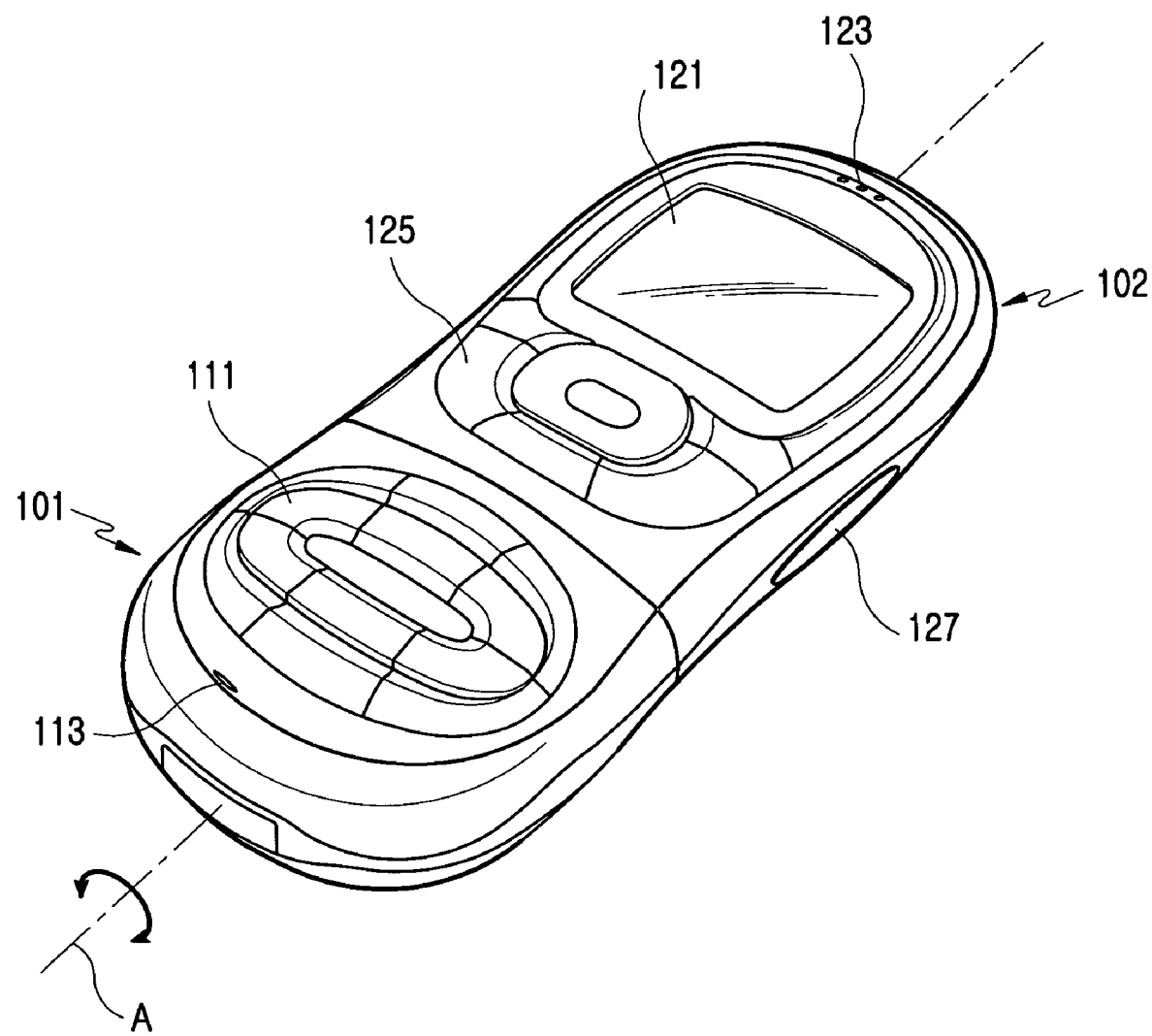
FIG. 1 is a perspective view illustrating a bar-type wireless communication terminal in accordance with a first embodiment of the present invention.

Various embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when unnecessary. The terms used in the following description are terms defined taking into consideration the functions obtained in accordance with the present invention. The definitions of these terms should be determined based on the whole content of this specification as they can change in accordance with the option of a user or a usual practice.

Figure 2:
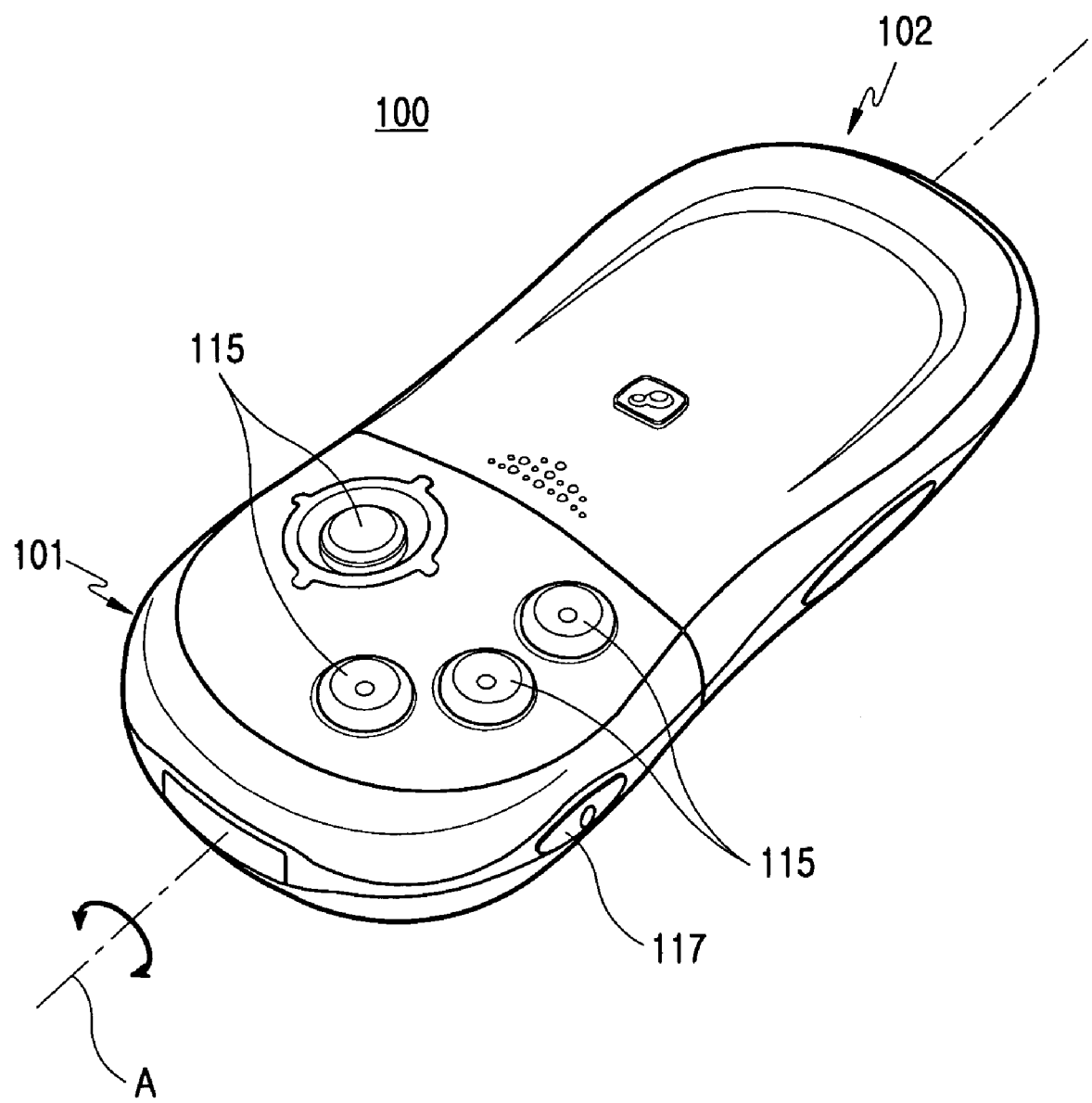
FIG. 2 is a perspective view illustrating the rear surface of the wireless communication terminal shown in FIG. 1.

FIG. 1 is a perspective view illustrating a bar-type wireless communication terminal, designated as a reference numeral 100, in accordance with a first embodiment of the present invention. FIG. 2 is a perspective view illustrating the rear surface of the wireless communication terminal 100 shown in FIG. 1. As shown in FIGS. 1 and 2, the wireless communication terminal 100 comprises a lower body 101 and an upper body 102. The upper body 102 is rotatably coupled to the upper end of the lower body 101. The upper body 102 is configured to enable reversal of its front and rear surfaces at the upper end of the lower body 101.

Figure 3:
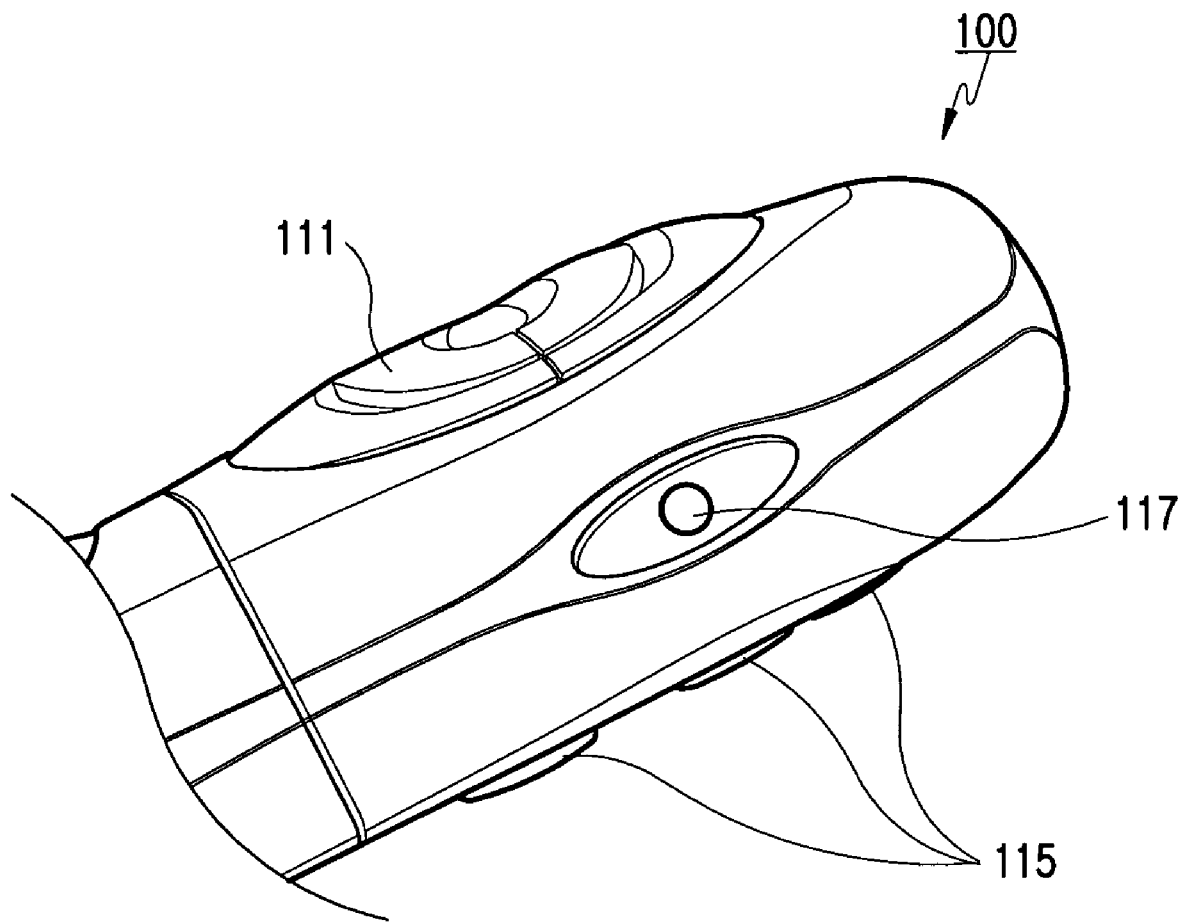
FIG. 3 is a perspective view illustrating one side surface of the wireless communication terminal shown in FIG. 1.

The lower body 101 is provided at its front surface with a first keypad 111 and transmitter 113, and at its rear surface with a second keypad 115. Further, as shown in FIGS. 2 and 3, a camera lens unit 117 is mounted to one side surface of the lower body 101. The first keypad 111 is composed of a plurality of key buttons, which are arranged in a 3×4 array. These key buttons are used for the input of simple data such as short messages and paging messages. The second keypad 115 is used as a shutter switch or zoom switch for operating the camera lens unit 117. The second keypad 115 is also used where the wireless communication terminal 100 is used for purposes, other than communications, such as multimedia services, games and so on. Therefore, the second keypad 115 may be arranged in various arrangements in different products, in addition to the arrangement shown in FIG. 2.

The upper body 102 is provided at its front surface with a display device 121, a receiver 123 positioned above the display device 121, and a third keypad 125 positioned under the display device 121. The third keypad 125 is composed of functional keys, for example, a menu call key for utilizing functions of the terminal 100, talk/end keys and so on. The upper body 102 is also provided at its one side surface with a two-way key 127, which is used to adjust speaker volume during conversation, to select a desired menu, and so on.

The upper body 102 is rotatably coupled to the upper end of the lower body 101 about a rotation axis A extending in a longitudinal direction of the lower body 101. Therefore, the upper body 102 is rotatable in a twisting direction relative to the rotation axis A, thereby enabling reversal of front and rear surfaces thereof.

Figure 4:
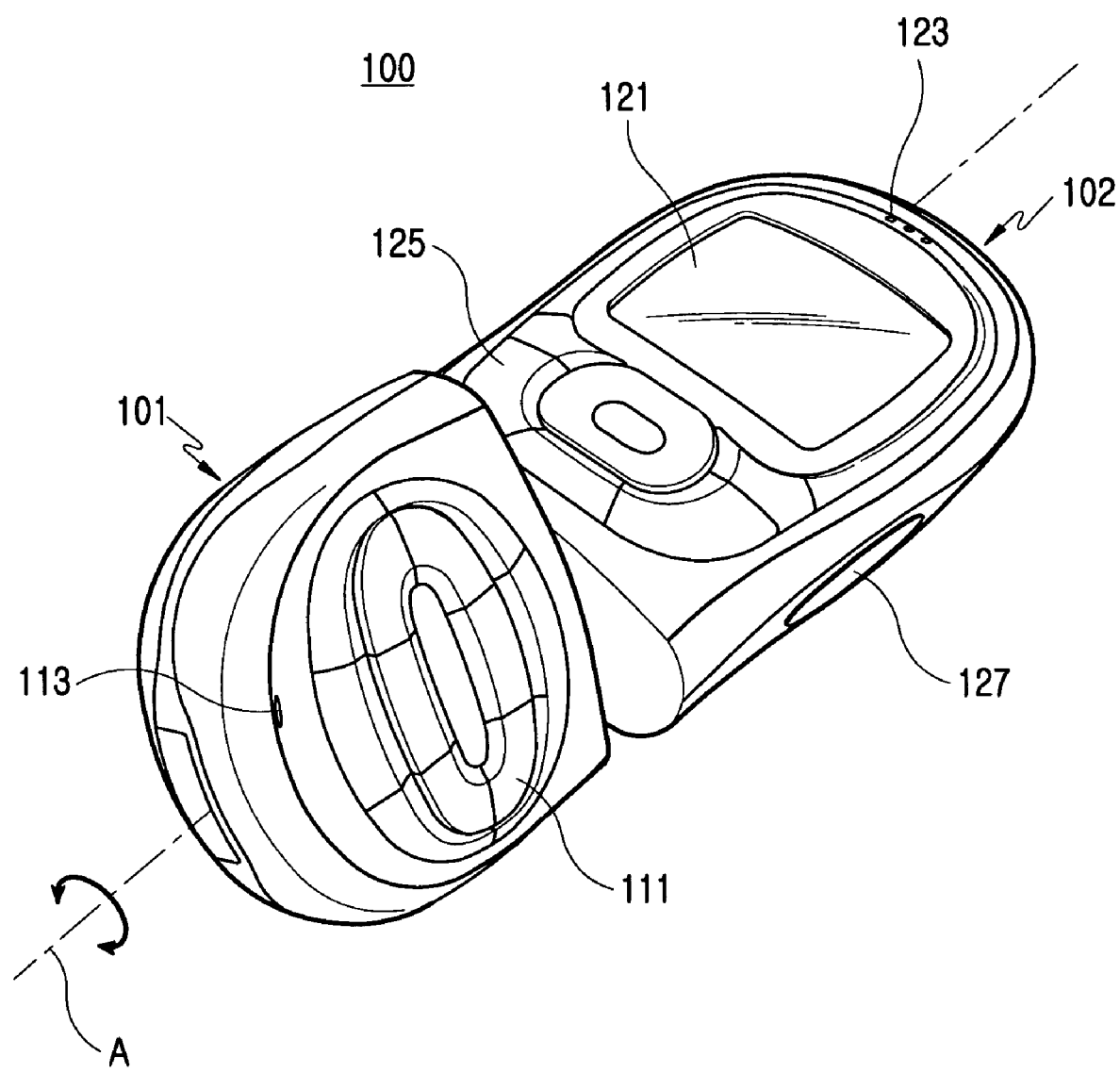
FIG. 4 is a perspective view illustrating a state wherein the bar-type wireless communication terminal shown in FIG. 1 is used as a camera.
Figure 5:
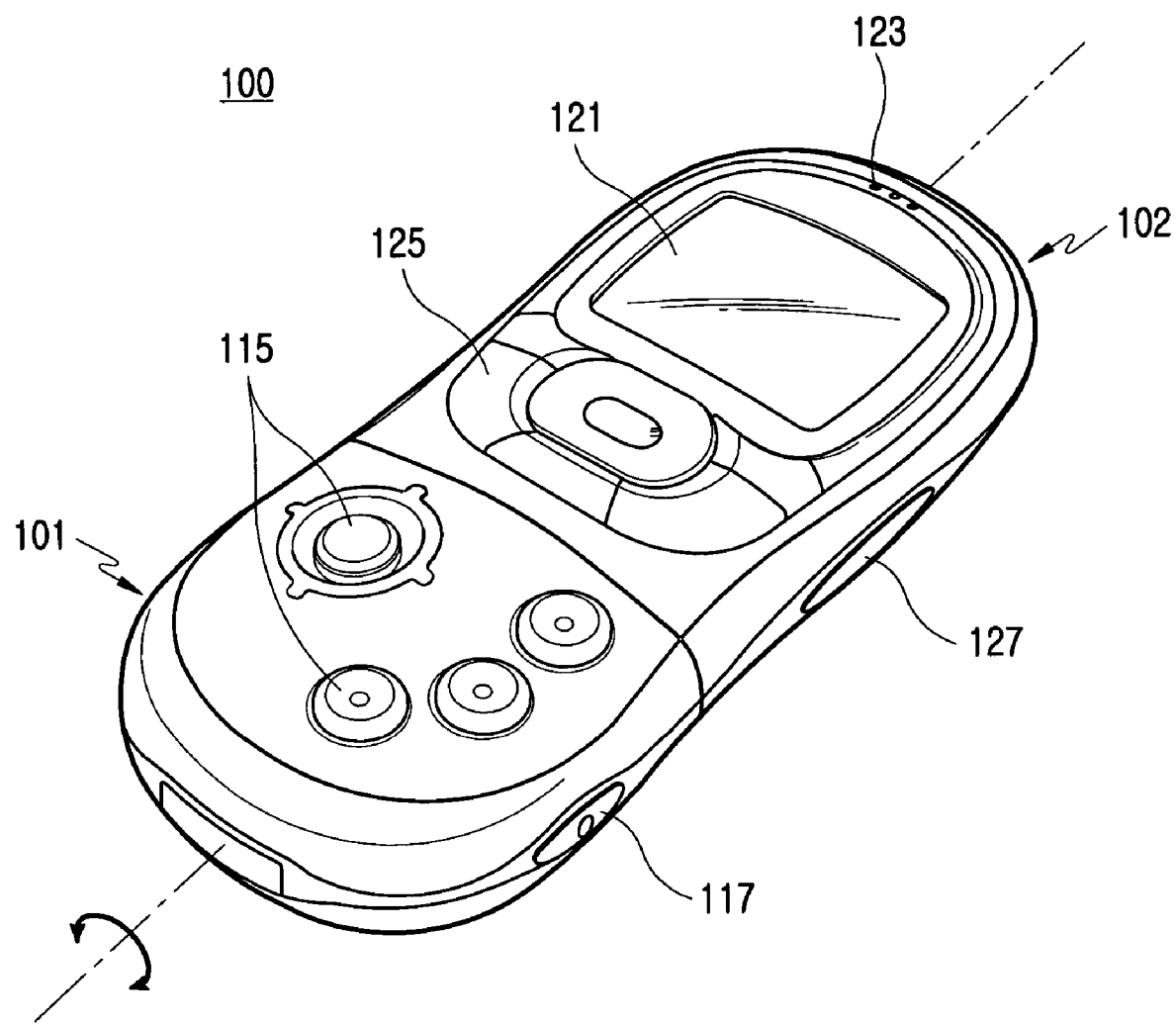
FIG. 5 is a perspective view illustrating a state wherein the bar-type wireless communication terminal shown in FIG. 1 is used as a game unit.

FIG. 4 is a perspective view illustrating a state wherein the bar-type wireless communication terminal 100 is used as a camera, and FIG. 5 is a perspective view illustrating a state wherein the terminal 100 is used as a game unit.

As shown in FIG. 4, where the upper body 102 of the terminal 100 is rotated so that the display device 121 faces the user in a state wherein the camera lens unit 117 faces an object to be photographed, the user can utilize the terminal 100 as a digital camera. In this case, the upper body 102 and lower body 101 can be fixed at a certain angle according to the convenience of the user. Although not shown, if the upper body 102 is rotated so that the display device 121 faces the user in a state wherein the camera lens unit 117 faces the user, the terminal 100 can perform video communications. In this case, the second keypad 115 is used as a shutter switch or zoom switch and so on.

As shown in FIG. 5, in a state wherein the upper body 102 of the terminal 100 is rotated at an angle of about 180°, the user can play games, stored in the terminal 100 or downloaded from service companies, using the second keypad 115 provided at the rear surface of the lower body 101. In this case, the second keypad 115 is used as manipulation keys for games. As such, the second keypad 115 may be utilized in different ways according to the multiple uses of the terminal 100. The arrangement of the key buttons thereof can be appropriately determined to increase manipulation convenience.

Referring to FIGS. 6 to 12, a rotary type hinge device, which enables the implementation of the wireless communication terminal 100 having the above described construction, will be explained.

Figure 6:
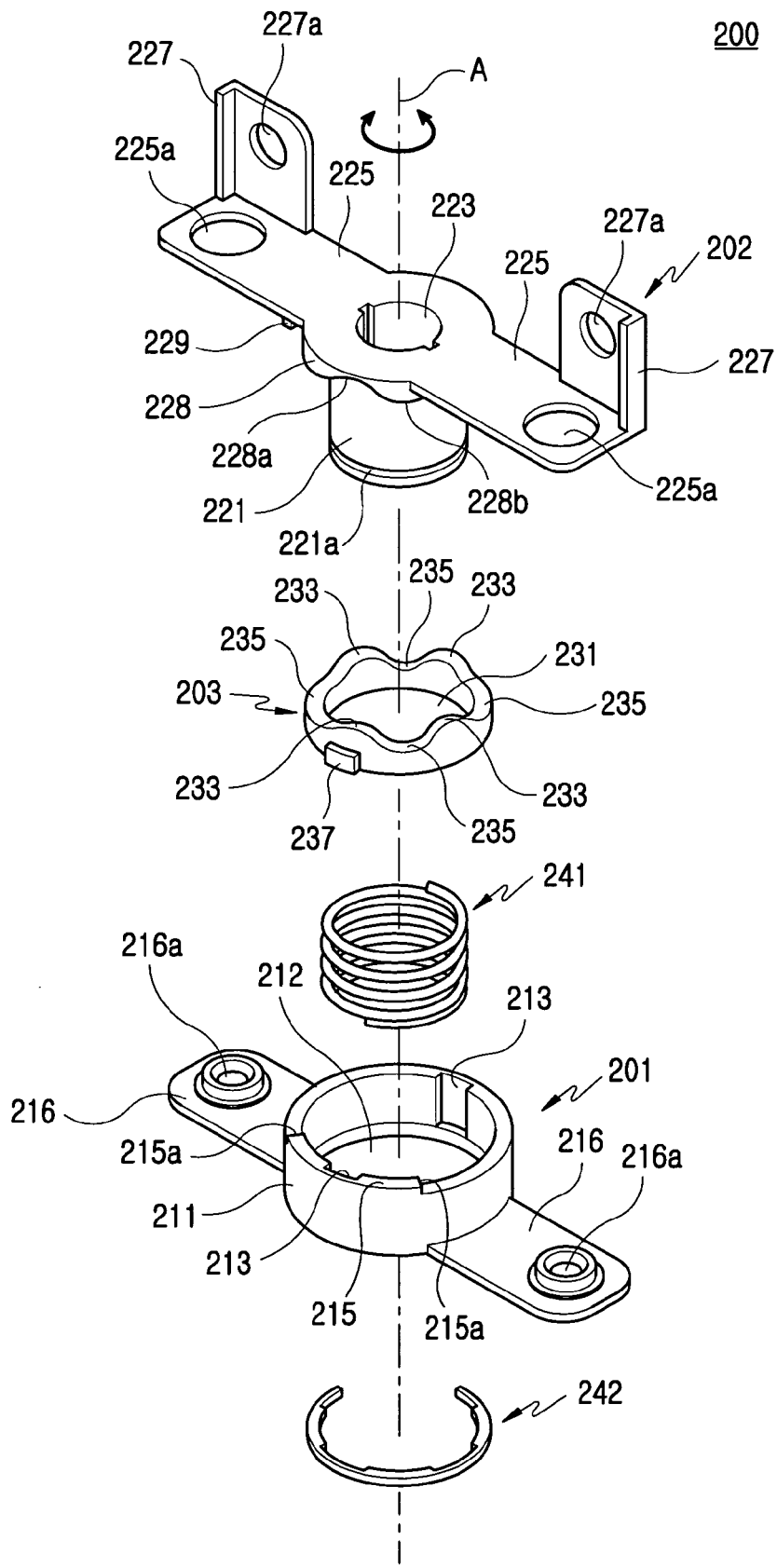
FIG. 6 is an exploded perspective view illustrating a rotary type hinge device for a bar-type wireless communication terminal, in accordance with another embodiment of the present invention.
Figure 7:
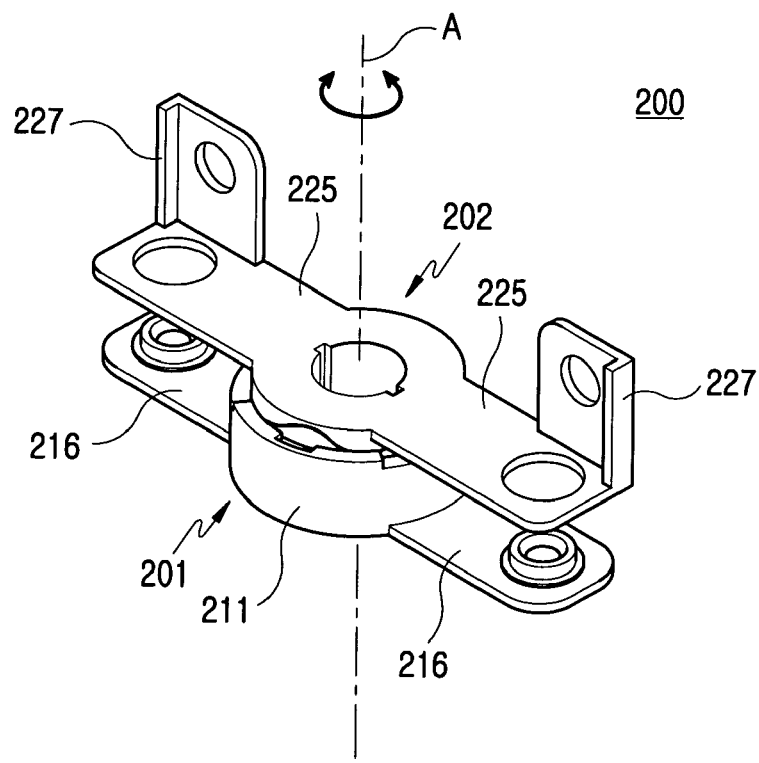
FIG. 7 is a perspective view illustrating an assembled state of the rotary type hinge device shown in FIG. 6.
Figure 8:
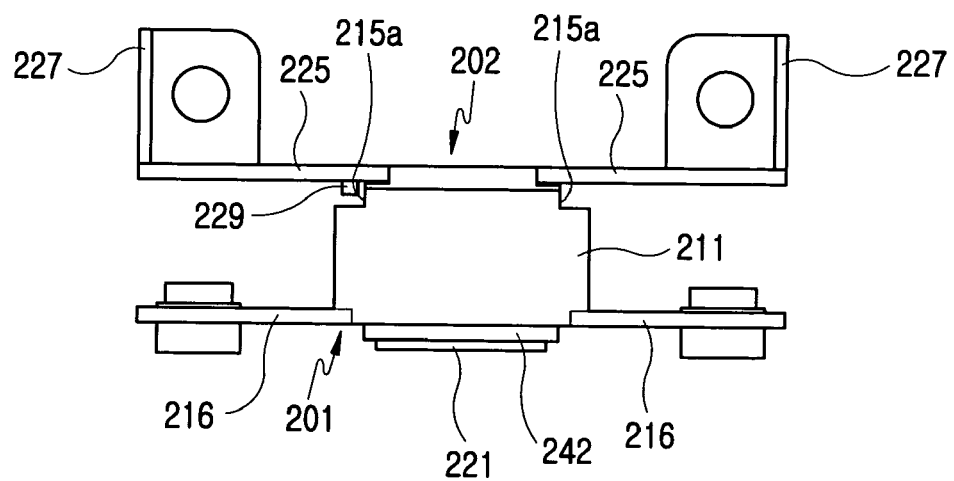
FIG. 8 is a side view illustrating the rotary type hinge device shown in FIG. 7.

FIGS. 6 to 8 are an exploded perspective view, perspective view and side view, respectively, illustrating a rotary type hinge device, designated as a reference numeral 200, for the bar-type wireless communication terminal in accordance with another embodiment of the present invention.

As shown in FIGS. 6 to 8, the rotary type hinge device 200 comprises a first hinge base 201 and a second hinge base 202.

The first hinge base 201 includes a hinge housing 211 providing a vertically extending rotation axis A, and first coupling arms 216 extended laterally in opposite directions from the lower end of the hinge housing 211. The first coupling arms 216 are formed with coupling holes 216a adapted to fixedly mount the first coupling arms 216 inside the lower body 101 of the terminal 100, respectively. The hinge housing 211 defines a receiving space 212 extending vertically throughout the hinge housing 211, and is formed at its inner peripheral surface with vertically extended guide grooves 213 having a certain depth. The hinge housing 211 is also formed with a first stopper 215 protruded upwardly from the upper end thereof while extending circumferentially within a substantially constant angular range. The rotation ranges of the second hinge base 202 and the upper body 102 of the terminal 100 are determined according to the angular range of the formed first stopper 215.

The second hinge base 202 includes a rotating member 221, configured to be inserted through the upper end of the hinge housing 211 and rotated inside the receiving space 212 of the first hinge base 201, and second coupling arms 225 extended laterally in opposite directions from the upper end of the rotating member 221. The rotating member 221 extends through the receiving space 212 of the hinge housing 211 so that its lower end portion is protruding downwardly from the lower end of the hinge housing 211. The lower end portion of the rotating member 221, protruding downwardly out of the hinge housing 211, is formed with an annular fitting groove 221a for allowing an E-ring 242 to be fitted therein. As the E-ring 242 is fitted in the fitting groove 221a, the first hinge base 201 is coupled with the second hinge base 202. The second coupling arms 225 are further provided at their ends with coupling pieces 227 upwardly extended therefrom, respectively. The ends of the second coupling arms 225 and coupling pieces 227 are formed with coupling holes 225a and 227a, respectively. The rotating member 221 is formed with a vertically extended through hole 223, which provides a passage for a flexible printed circuit (not shown).

The second hinge base 202 further includes a second stopper 229. The second stopper 229 is radially extended by a certain distance from the outer peripheral surface of the rotating member 221, and protrudes downwardly from the lower surface of one of the second coupling arms 225. According to the rotation of the second hinge base 202, the second stopper 229 slidably moves while being in contact with the upper end surface of the hinge housing 211, and this sliding movement of the second stopper 229 is limited by both end walls 215a of the first stopper 215. The rotation range of the second hinge base 202 can be variously selected from among at or about 90°, 180°, 270° or 360°, according to the shape of the first and second stoppers 215 and 229, and the angular range of the first stopper 215.

The second hinge base 202 further includes a second hinge cam 228, which extends downwardly from the lower surface of the second coupling arms 225 while surrounding the outer peripheral surface of the rotating member 221. The second hinge cam 228 is provided at its end with valley-shaped portions 228a and ridge-shaped portions 228b, which are alternately arranged in a circumferential direction thereof.

Referring again to the first hinge base 201, a first hinge cam 203 corresponding to the second hinge cam 228 is received in the hinge housing 211. The first hinge cam 203 is formed with a vertically extended hole 231 to allow the rotating member 221 to pass therethrough, and formed at its one end with ridge-shaped portions 233 and valley-shaped portions 235 corresponding to the valley-shaped portions 228a and ridge-shaped portions 228b of the second hinge cam 228. The first hinge cam 203 comes into close contact with the second hinge cam 228 by an elastic force generated from coil spring 241. In addition, the first hinge cam 203 is formed at its outer peripheral surface with guide protrusions 237 corresponding to the guide grooves 213 of the hinge housing 211. Therefore, according to the rotation of the second hinge base 202, the respective ridge-shaped and valley-shaped portions 233, 235, 228a and 228b of the first and second hinge cams 203 and 228 come into slidable contact with each other, thereby guiding vertical reciprocating movements of the first hinge cam 203. The operation of such hinge device 200 can be understood easily with reference to commonly assigned U.S. Pat. No. 6,292,980, issued on Sep. 25, 2001, the contents of which are herein incorporated by reference.

Referring again to the second hinge base 202, the rotation thereof is stopped at a position determined when the ridge-shaped and valley-shaped portions 233, 235, 228a and 228b of the first and second hinge cams 203 and 228 are engaged with each other, respectively. Depending on the arrangement angle between the ridge-shaped portions 233 and 228b and the valley-shaped portions 235 and 228a, the second hinge base 202 has various rotation stop angles. For example, where the ridge-shaped portions 233 and 228b are spaced apart from the valley-shaped portions 235 and 228a each other at intervals of about 90°, as discussed in U.S. Pat. No. 6,292,980, adjacent ones of the valley-shaped portions are spaced apart from each other at intervals of about 180°. Consequently, the rotation stop angle of the second hinge base 202 is about 180°.

Where the ridge-shaped portions 233 and 228b are spaced apart from the valley-shaped portions 235 and 228a each other at intervals of about 45°, the rotation stop angle of the second hinge base 202 may be set at about 90°. Although not shown, instead of the ridge-shaped and valley-shaped portions 233, 235, 228a and 228b, a plurality of relatively small recesses and protuberances may be arranged at substantially constant angular intervals. In this case, the second hinge base 202 has a rotation angle of not more than 90°, and the user can sense a click feeling from sound or shock caused by the collision of the recesses and protuberances during the rotation of the upper body of the terminal.

Figure 9:
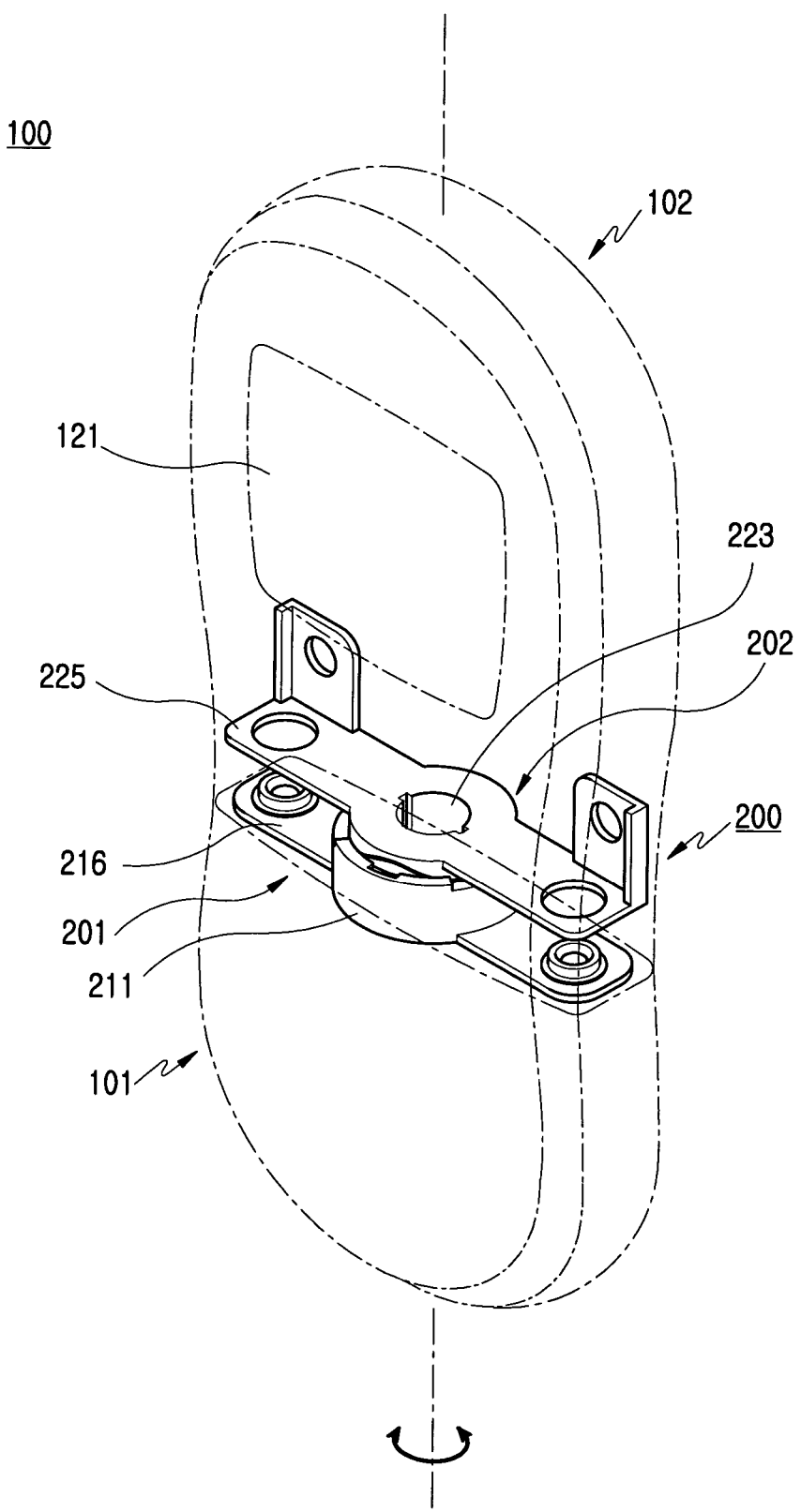
FIG. 9 is a view of a state wherein the rotary type hinge device shown in FIG. 6 is applied to the bar-type wireless communication terminal.

FIG. 9 is a view of a state wherein the rotary type hinge device 200 shown in FIG. 6 is applied to the bar-type wireless communication terminal 100. As shown in FIG. 9, the rotary type hinge device 200, constructed as stated above, rotatably couples the lower body 101 to the upper body 102. The first hinge base 201 is received inside the upper end of the lower body 101, and the second hinge base 202 is received inside the lower end of the upper body 102, and then the rotating member 221 of the second hinge base 202 is fitted inside the hinge housing 211 of the first hinge base 201, thereby causing the lower body 101 and upper body 102 to be rotatably coupled with each other.

Figure 10:
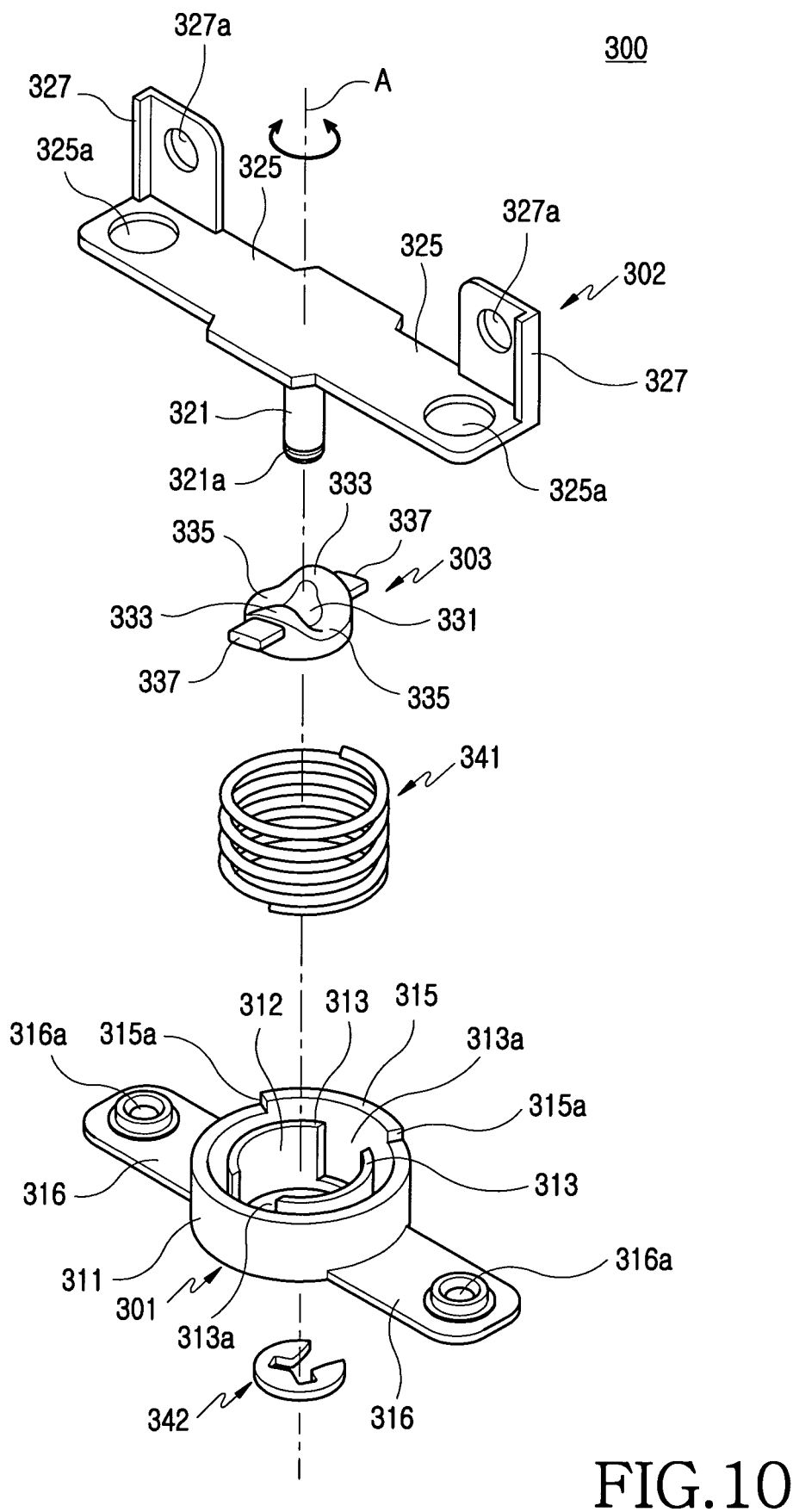
FIG. 10 is a perspective view illustrating a rotary type hinge device for a bar-type wireless communication terminal, in accordance with another embodiment of the present invention.
Figure 11:
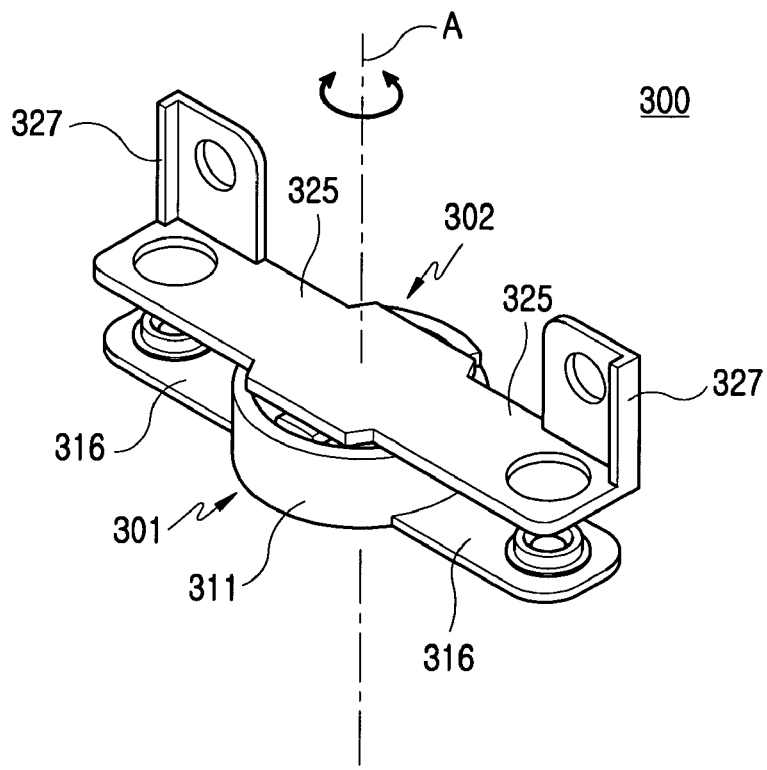
FIG. 11 is a perspective view illustrating an assembled state of the rotary type hinge device shown in FIG. 10.
Figure 12:
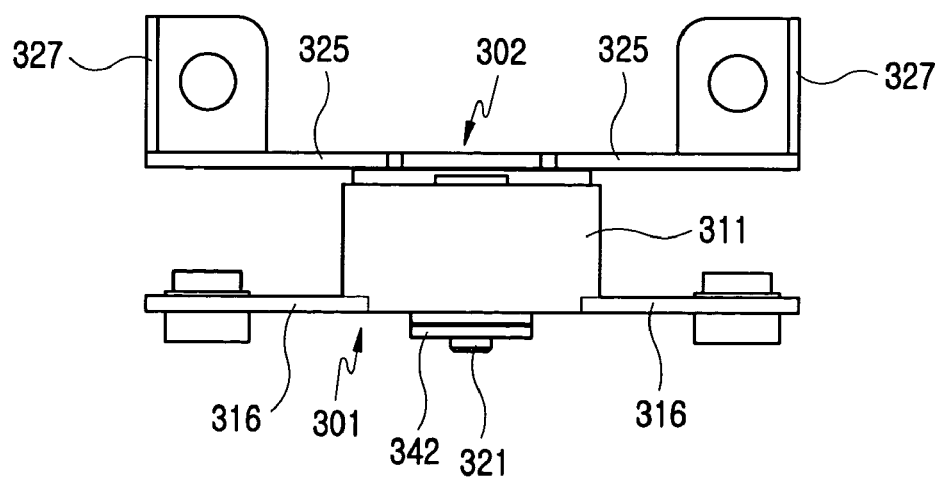
FIG. 12 is a side view illustrating the rotary type hinge device shown in FIG. 11.

FIGS. 10 to 12 are an exploded perspective view, perspective view, and side view, respectively, illustrating a rotary type hinge device, designated as a reference numeral 300, for the bar-type wireless communication terminal in accordance with another embodiment of the present invention. As shown in FIGS. 10 to 12, the rotary type hinge device 300 according to this embodiment of the present invention comprises a first hinge base 301 and a second hinge base 302.

The first hinge base 301 includes a hinge housing 311 providing a vertically extending rotation axis A, and first coupling arms 316 extending laterally in opposite directions at the lower end of the hinge housing 311. The first coupling arms 316 are formed with coupling holes 316a adapted to fixedly mount the first coupling arms 316 inside the lower body 101 of the terminal 100, respectively. The hinge housing 311 defines a vertically extended receiving space 312 therein, and is formed with a guide rib 313 inside the receiving space 312. The guide rib 313 extends vertically at a position spaced apart from the inner peripheral surface of the hinge housing 311 by a certain distance. The guide rib 313 has a pair of guide slots 313a. The guide slots 313a extend downwardly from the upper end of the guide rib 313. The hinge housing 311 is formed with a first stopper 315 protruded upwardly from the upper end thereof while extending circumferentially within a substantially constant angular range. The rotation ranges of the second hinge base 302 and the upper body 102 of the terminal 100 are determined according to the angular range of the formed first stopper 315.

The second hinge base 302 includes a rotating member 321, configured to be inserted through the upper end of the hinge housing 311 and rotated inside the receiving space 312, and second coupling arms 316 extended laterally in opposite directions from the upper end of the rotating member 321. The rotating member 321 extends through the receiving space 312 of the hinge housing 311 so that its lower end portion is protruding downwardly from the lower end of the hinge housing 311. The lower end portion of the rotating member 321, protruding downwardly out of the hinge housing 311, is formed with an annular fitting groove 321a for allowing an E-ring 342 to be fitted therein. As the E-ring 342 is fitted in the fitting groove 321a, the first hinge base 301 is coupled with the second hinge base 302. The second hinge base 302 further includes coupling pieces 327 and a second stopper (not shown).

A detailed description with respect to constructions of the second coupling arms 325, coupling pieces 327 and second stopper provided in the second hinge base 302, and with respect to the rotation range limitation of the second hinge base 302 affected by the second stopper and both end walls 315a of the first stopper 315, will be omitted because it is the same as in the first embodiment of the invention.

The second hinge base 302 further includes a second hinge cam, which extends downwardly from the lower surface of the second coupling arm 325 while surrounding the outer peripheral surface of the rotating member 321. The second hinge cam is provided at its end with valley-shaped portions and ridge-shaped portions, which are alternately arranged in a circumferential direction thereof. The construction of the second hinge cam can be understood easily with reference to said U.S. Pat. No. 6,292,980 as mentioned above.

Referring again to the first hinge base 301, a first hinge cam 303 corresponding to the second hinge cam is received in the hinge housing 311. The first hinge cam 303 is formed with a vertically extended hole 331 to allow the rotating member 321 to pass therethrough, and formed with ridge-shaped portions 333 and valley-shaped portions 335 corresponding to the valley-shaped portions and ridge-shaped portions of the second hinge cam. The first hinge cam 303 comes into close contact with the second hinge cam by an elastic force generated by coil spring 341. In addition, the first hinge cam 303 is formed at its outer peripheral surface with guide protrusions 337 corresponding to the guide slots 313a formed at the guide rib 313. The guide protrusions 337 protrude out of the guide rib 313.

As stated above, the first hinge cam 303 comes into close contact with the second hinge cam by the elastic force generated by coil spring 341. The coil spring 341 surrounds the guide rib 313 as it is received inside the hinge housing 311. Therefore, the elastic force of the coil spring 341 is transmitted to the first hinge cam 303 through the guide protrusions 337.

The rotary type hinge device 300 according to this embodiment of the present invention can be advantageously applied to relatively small slim type terminals because the rotating member 321 thereof is constructed as a shaft having a smaller diameter than that of the rotating member 221 provided in the first embodiment of the invention.

As apparent from the above description, the disclosed embodiments of the present invention provides a bar-type wireless communication terminal comprising an upper body, a lower body, and a rotary type hinge device for rotatably coupling the upper body and lower body in a twisting direction relative to each other, thereby enabling the implementation of a new type wireless communication terminal. This new type wireless communication terminal contributes to expanding the number of terminal configurations to satisfy customers' increasingly diversified tastes. Further, according to the disclosed embodiments of the present invention, in conjunction with the display device and camera lens unit additionally installed in the wireless communication terminal, the image display direction of the display device as well as the aim direction of the camera lens unit can be set at various different angles, thereby allowing the user to conveniently utilize the wireless communication terminal for image capturing and video communications.

Although various embodiments of the present invention have been disclosed for illustrative purposes, those skilled in the art can appreciate that various modifications, additions and substitutions are possible, without departing from the scope and spirit of the invention as disclosed in the accompanying claims.

What is claimed is:

1. A bar-type wireless communication terminal comprising:

a lower body having a camera lens unit arranged in its one side, a first keypad arranged in its front side and a second keypad arranged in its rear side; and an upper body having a display device disposed in its front side, said upper body being coupled to an upper end of the lower body in such a manner that the upper body is allowed to rotate in a twisted direction with respect to a rotation axis extending in a longitudinal direction of the lower body;

and further comprising:

a first hinge base fixed in the lower body, the first hinge base having a hinge housing and first coupling arms extended laterally in opposite directions from a lower end of the hinge housing, the hinge housing defining a vertically extended receiving space; and a second hinge base fixed in the upper body, the second hinge base having a rotating member and second coupling arms extended laterally in opposite directions from an upper end of the rotating member, the rotating member being received inside the hinge housing to rotate therein relative to a rotation axis extending in a vertical direction of the first hinge base.

2. The bar-type wireless communication terminal as set forth in claim 1, further comprising:

a first hinge cam vertically reciprocating inside the hinge housing by receiving a certain elastic force, the first hinge cam being formed with a receiving hole for allowing the rotating member to pass therethrough, the first hinge cam also being formed at its end with ridge-shaped and valley-shaped portions, which are alternately arranged in a circumferential direction thereof; and a second hinge cam extended downwardly from a lower surface of the second coupling arms while surrounding an outer peripheral surface of the rotating member, the second hinge cam being formed at its end with ridge-shaped and valley-shaped portions alternately arranged in a circumferential direction thereof, the ridge-shaped and valley-shaped portions of the second hinge cam corresponding to the valley-shaped and ridge-shaped portions of the first hinge cam.

3. The bar-type wireless communication terminal as set forth in claim 2, wherein the respective ridge-shaped and valley-shaped portions formed at each of the first and second hinge cams are engaged with each other by an elastic force applied to the first hinge cam, thereby causing the rotation of the second hinge base to be stopped at substantially constant angular intervals.

4. The bar-type wireless communication terminal as set forth in claim 3, wherein the second hinge base is stopped in rotation at intervals of about 90°.

5. The bar-type wireless communication terminal as set forth in claim 2, further comprising:
   guide grooves vertically extended at an inner peripheral surface of the hinge housing; and
   guide protrusions radially protruded from an outer peripheral surface of the first hinge cam and configured to linearly reciprocate inside the guide grooves, respectively, whereby the first hinge cam linearly reciprocates inside the hinge housing.

6. The bar-type wireless communication terminal as set forth in claim 2, further comprising a coil spring inside the hinge housing, the coil spring providing an elastic force in a direction for causing the first and second hinge cams to come into close contact with each other.

7. The bar-type wireless communication terminal as set forth in claim 2, further comprising:
   a guide rib formed inside the hinge housing, the guide rib vertically extending at a position spaced apart from an inner peripheral surface of the hinge housing by a certain distance;
   guide slots extended downwardly from an upper end of the guide rib; and
   guide protrusions radially protruded from an outer peripheral surface of the first hinge cam and configured to linearly reciprocate inside the guide slots, whereby the first hinge cam linearly reciprocates inside the hinge housing.

8. The bar-type wireless communication terminal as set forth in claim 7, further comprising a coil spring between the inner peripheral surface of the hinge housing and the guide rib, thereby providing an elastic force to the first hinge cam, the elastic force of the coil spring being applied to the guide protrusions of the first hinge cam.

9. The bar-type wireless communication terminal as set forth in claim 1, wherein the rotating member is inserted from an upper end of the hinge housing so that its lower end portion is protruded downwardly from the lower end of the hinge housing, the rotating member being formed at an outer peripheral surface of the lower end portion with an annular fitting groove for allowing an E-ring to be fitted therein.

10. The bar-type wireless communication terminal as set forth in claim 1, wherein the rotating member is formed with a vertically extended through hole.

11. The bar-type wireless communication terminal as set forth in claim 1, further comprising:
   a first stopper protruded upwardly from the upper end of the hinge housing while extending circumferentially within a certain angular range; and
   a second stopper radially extended from an outer peripheral surface of the rotating member and protruded downwardly from a lower surface of the second coupling arms, whereby the first and second stoppers limit a rotation range of the second hinge base.

12. The bar-type wireless communication terminal as set forth in claim 11, wherein the second hinge base is rotated within a range of about 180°.

13. A bar-type wireless communication terminal comprising:
   a lower body having a camera lens unit arranged in its one side, a first keypad arranged in its front side and a second keypad arranged in its rear side; and
   an upper body having a display device disposed in its front side, said upper body being coupled to an upper end of the lower body in such a manner that the upper body is allowed to rotate in a twisted direction with respect to a rotation axis extending in a longitudinal direction of the lower body;
   and further comprising:
   a first hinge base having a hinge housing and first coupling arms extended laterally in opposite directions from a lower end of the hinge housing, the hinge housing defining a vertically extended receiving space, the first hinge base being fixed inside the lower body so that the hinge housing is protruded upwardly out of the upper end of the lower body at its upper end; and
   a second hinge base having a rotating member and second coupling arms extended laterally in opposite directions from an upper end of the rotating member, the rotating member being coupled to the hinge housing to rotate therein relative to a rotation axis extending in a vertical direction of the first hinge base, the second hinge base being fixed inside the upper body so that the rotating member is protruded downwardly out of a lower end of the upper body at its lower end.

14. The bar-type wireless communication terminal as set forth in claim 13, further comprising:
   a first hinge cam vertically reciprocating inside the hinge housing by receiving a certain elastic force, the first hinge cam being formed with a receiving hole for allowing the rotating member to pass therethrough, the first hinge cam also being formed at its end with ridge-shaped and valley-shaped portions, which are alternately arranged in a circumferential direction thereof; and
   a second hinge cam extended downwardly from a lower surface of the second coupling arms while surrounding an outer peripheral surface of the rotating member, the second hinge cam being formed at its end with ridge-shaped and valley-shaped portions alternately arranged in a circumferential direction thereof, the ridge-shaped and valley-shaped portions of the second hinge cam corresponding to the valley-shaped and ridge-shaped portions of the first hinge cam.

15. The bar-type wireless communication terminal as set forth in claim 14, wherein the respective ridge-shaped and valley-shaped portions formed at each of the first and second hinge cams are engaged with each other by an elastic force applied to the first hinge cam, thereby causing the rotation of the second hinge base to be stopped at substantially constant angular intervals.

16. The bar-type wireless communication terminal as set forth in claim 14, further comprising:
   guide grooves vertically extended at an inner peripheral surface of the hinge housing; and
   guide protrusions radially protruded from an outer peripheral surface of the first hinge cam and configured to linearly reciprocate inside the guide grooves, respectively, whereby the first hinge cam linearly reciprocates inside the hinge housing.

17. The bar-type wireless communication terminal as set forth in claim 14, further comprising a coil spring inside the hinge housing, the coil spring providing an elastic force in a direction for causing the first and second hinge cams to come into close contact with each other.

18. The bar-type wireless communication terminal as set forth in claim 13, wherein the rotating member is inserted from an upper end of the hinge housing so that its lower end portion is protruded downwardly from the lower end of the hinge housing, the rotating member being formed at an outer peripheral surface of the lower end portion with an annular fitting groove for allowing an E-ring to be fitted therein.

19. The bar-type wireless communication terminal device as set forth in claim 13, wherein the rotating member is formed with a vertically extended through hole for providing a passage for a flexible printed circuit.

20. The bar-type wireless communication terminal as set forth in claim 13, further comprising:
   a first stopper formed at the upper end of the hinge housing while extending circumferentially within a certain angular range; and
   a second stopper radially extended from an outer peripheral surface of the rotating member and protruded downwardly from a lower surface of the second coupling arms, whereby the first and second stoppers limit a rotation range of the second hinge base.

21. The bar-type wireless communication terminal as set forth in claim 20, wherein the second hinge base is rotated within a range of about 180°.

* * * * *